(No Model.) 2 Sheets—Sheet 1.
J. I. DAVIS.
HAY RAKER AND LOADER.
No. 328,658. Patented Oct. 20, 1885.

WITNESSES:
Donn Twitchell
C. Sedgwick

INVENTOR:
J. I. Davis
BY Munn & Co
ATTORNEYS.

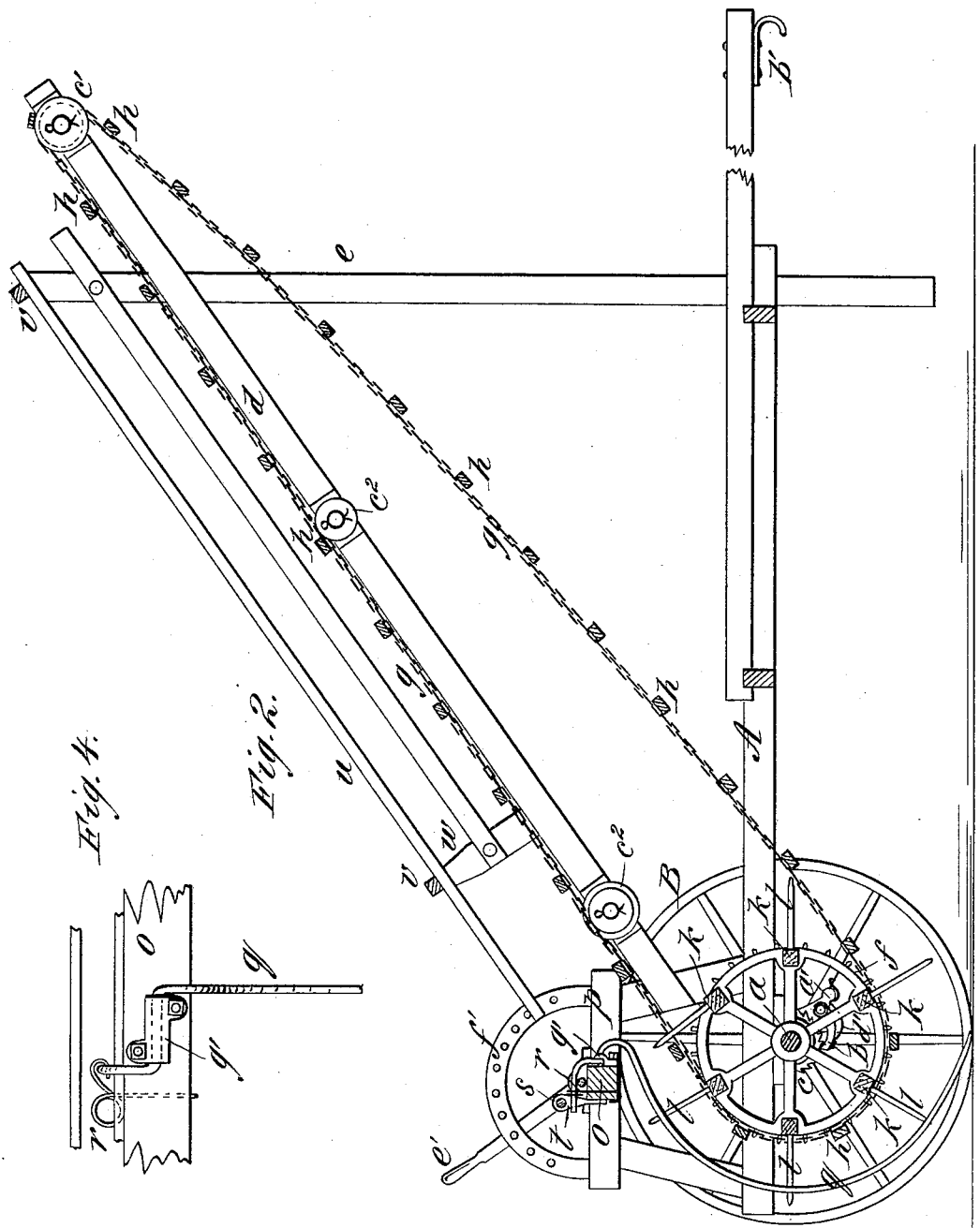

United States Patent Office.

JOSEPH I. DAVIS, OF MT. HAMILL, IOWA.

HAY RAKER AND LOADER.

SPECIFICATION forming part of Letters Patent No. 328,658, dated October 20, 1885.

Application filed July 8, 1884. Serial No. 137,112. (No model.)

*To all whom it may concern:*

Be it known that I, JOSEPH I. DAVIS, of Mt. Hamill, in the county of Lee and State of Iowa, have invented a new and Improved Hay Raker and Loader, of which the following is a full, clear, and exact description.

My improvements relate to machines for raking hay and loading it upon wagons; and the invention consists in certain novel features in the general construction of the machine, and in the operating mechanism, as hereinafter described and claimed.

Reference is to be had to the accompanying drawings, forming part of this specification, in which similar letters of reference indicate corresponding parts in all the figures.

Figure 1:
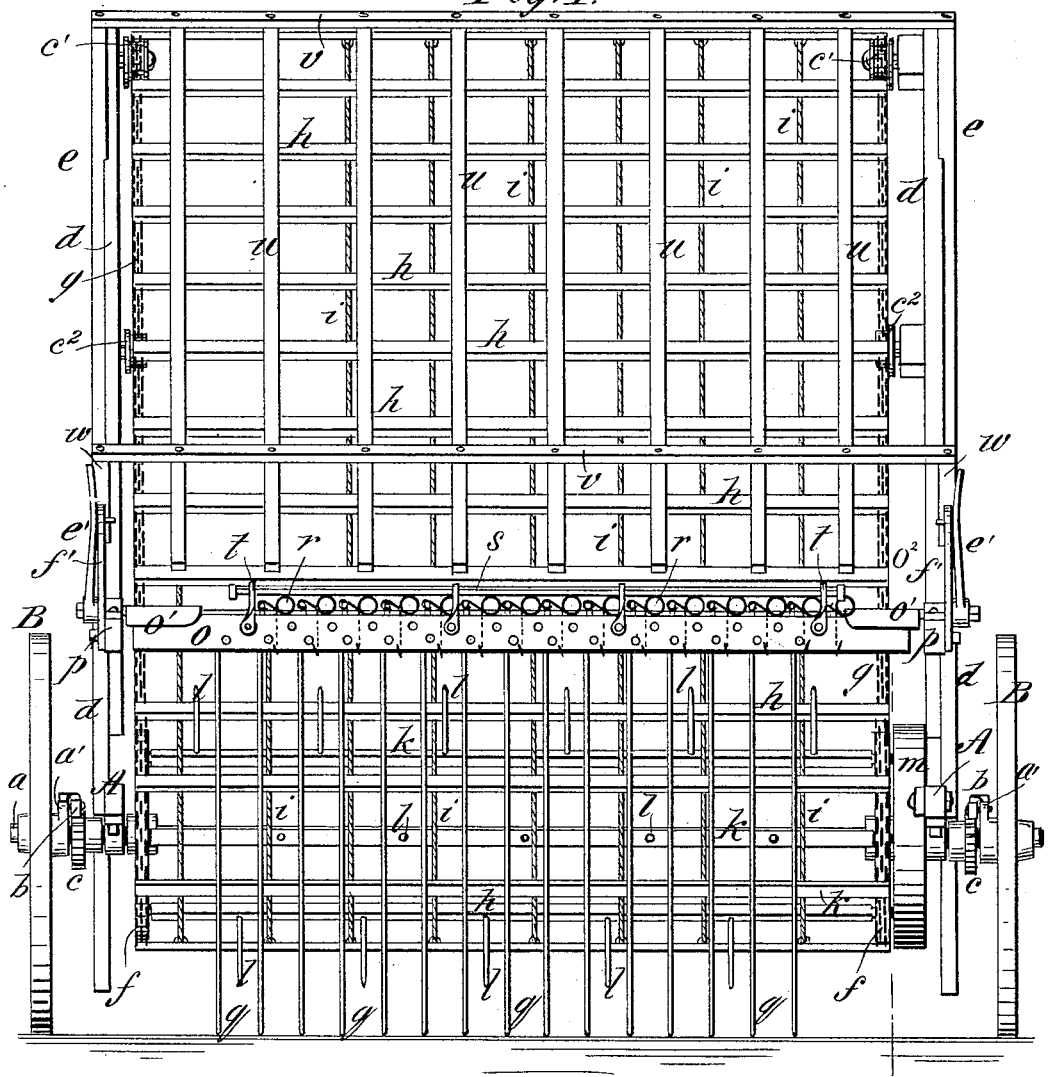
Figure 3:
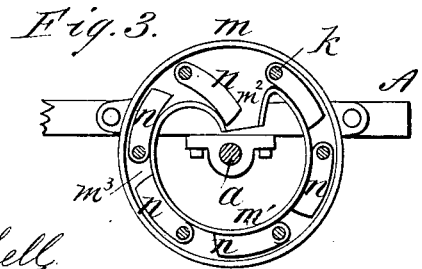

Figure 1 is a rear elevation of the machine. Fig. 2 is a sectional side elevation. Fig. 3 is a side view of the cam mechanism for shifting the reel-teeth, and Fig. 4 is a detail view showing the connections of the rake-teeth to the head.

A is the truck-frame, supported at the rear on a single axle, $a$, and wheels B B, which are loose on the axle. To a projection, $a'$, on the inner hub of each wheel is pivoted a pawl, $b$, for engaging a ratchet-wheel, $c$, on the axle, so that the axle is rotated when the machine moves forward, and the spring $d'$, that forces the pawl into engagement, is attached to the pawl and shaped to take against the projection $a'$, the object of which is that the spring retains the pawl in either position, as placed, either in or out of engagement with the ratchet.
The frame A has a shaft at the front, provided with a hook, $b'$, that can be caught over the rear axle of the wagon that is to be loaded.

$d$ $d$ are side bars, attached rigidly to the rear part of frame A, and extending at an inclination upward and forward, and $e$ $e$ are vertical standards, attached to the frame A and side bars, $d$, so as to support the machine at the front when it is disconnected from the wagon. The inclined bars $d$ carry the elevator, as next described.

On the axle $a$, near its ends, are chain-wheels $f f$, carrying the endless chains $g g$, that extend to and around double-flanged rollers or wheels $c'$, which are journaled on studs at the outer ends of bars $d$. There are also intermediate wheels, $c^2$, on the bars for supporting the upper side of the chain. The two chains are connected by cross-bars $h$, placed at suitable intervals, and the series of cross-bars carry endless ropes or wires $i$, that pass through eyes on the bars, or through holes in the bars, if preferred, so that the bars and ropes form an endless carrier supported and moved by the chains. The two chain-wheels $f$ are the heads of the lifting-reel.

$k$ $k$ are the longitudinal bars of the reel, provided with straight teeth $l$. The bars are not rigidly attached to the chain-wheels or heads, but have journals formed on their ends that enter holes in the rims of the heads. On the axle and outside of one head $f$ is a flanged disk or wheel, $m$, held to the frame A, Figs. 1 and 3, which is made with an internal cam-flange, $m'$, the ends of which flange are turned toward the center of the disk, forming a recess, $m^2$, at the upper part of the groove $m^3$, formed by said flange $m'$ and the peripheral flange of the disk $m$. The ends of the reel-bars $k$ at that side of the machine pass into the disk $m$ and carry tappets $n$, that lie in the grooves between the two flanges, whereby the reel-bars are held with their teeth projecting radially for about two-thirds of the rotation, and then by the inward curve of flange $m'$ the tappets are allowed to fall far enough to bring the teeth $l$ tangential. This occurs when the bars $k$ are moving downward and away from the carrier, so that the teeth withdraw endwise from the hay, the object being to prevent the teeth from dragging the hay down with them. The rake is at the rear of the machine, with its teeth extending beneath the lifting-reel. The head $o$ is provided with castings or arms $o'$ at its ends, made with journals $o^2$, that are sustained in boxes on supports $p$ on frame A. On the journal at one end is a lever, $e'$, having pins for engaging holes in a curved plate, $f'$, fixed on the frame, so that the rake-teeth can be raised from the ground and held, and also the head prevented from turning when the rake is at work. As shown most clearly in Fig. 4, the rake-teeth $q$ are bent sidewise, and the bent portions pass through boxes $q'$, attached on the head $o$, and their ends are again bent upward and over the head, where they engage the ends of springs $r$, attached on the head. This construction allows backward movement of the teeth in case they strike an obstruction, such movement being limited by a cross-rod, s, supported above the head by brackets t. The teeth on the lifting-reel are to be as numerous as required. I prefer to arrange them in such order that at least two shall pass between each pair of rake-teeth during one rotation of the reel. In order that the reel-teeth l may describe their proper movement without interfering with cross-bars h, the bars must be placed at a proper distance apart relative to the distance separating the reel-bars k and the teeth on the chain-wheels properly placed in proportion to the diameter of the wheels. There will be no difficulty in doing this. To keep the hay down on the carrier and prevent its being blown off I provide shield-bars u, extending lengthwise of and above the carrier. These are attached to cross-bars v, that are supported by the standards e and short posts w on side bars, d.

In operation, to load hay the machine is drawn behind the wagon, and the hay gathered by the rake is lifted by teeth of the reel and carried over upon the elevator, which carries the hay upward, and as the end of the elevator projects over the wagon the hay falls thereon from the carrier. By thus combining the operations of raking and loading there is a great saving of time and labor, and the work of stacking in the field can be dispensed with.

Having thus described my invention, what I claim as new, and desire to secure by Letters Patent, is—

In a combined hay raker and loader, constructed substantially as shown and described, the combination, with the flanged disk $m$, fixed to the main frame and provided with the internal flange, $m'$, having its ends turned inward to form the recess $m^2$ at the upper part of the groove $m^3$, of the rake-bars $k$, journaled in the chain-wheels $f$, having their ends extended through said wheels $f$, and carrying on said ends the tappets $n$, working in the groove $m^3$, as set forth.

JOSEPH I. DAVIS.

Witnesses:
 ALBERT C. SAX,
 CHARLES B. HOLLAND.